United States Patent [19]

Okita et al.

[11] Patent Number: 4,742,509
[45] Date of Patent: May 3, 1988

[54] DISK ROTATING DEVICE

[75] Inventors: Masao Okita; Yoshio Matsuwake; Yukio Matsumoto, all of Furukawa, Japan

[73] Assignee: Alps Electric Co., Ltd., Japan

[21] Appl. No.: 916,716

[22] Filed: Oct. 8, 1986

[30] Foreign Application Priority Data

Oct. 11, 1985 [JP] Japan .................................. 60-224909

[51] Int. Cl.⁴ ..................... G11B 19/00; G11B 11/00; G11B 17/00
[52] U.S. Cl. ........................................ 369/270; 360/99
[58] Field of Search ...................... 369/270, 271, 77.1, 369/75.2; 360/99

[56] References Cited

U.S. PATENT DOCUMENTS 4,390,979  6/1983  Saito ..................................... 369/270
4,561,084 12/1985  Satake et al. ........................ 369/75.2
4,628,385 12/1986  Janssen et al. ...................... 369/270

FOREIGN PATENT DOCUMENTS 2388366 11/1978 France ................................. 369/270

Primary Examiner—Steven L. Stephan
Attorney, Agent, or Firm—Guy W. Shoup

[57] ABSTRACT

A device for rotating a disk in a sound or data recording and reproducing apparatus includes a spindle fitted about the output shaft of an electric motor. A disk centering member is also fitted about the output shaft of the motor and projects above the spindle. A disk holder is rotatable toward the spindle for holding against it the disk which has been inserted about the disk centering member, and cooperates with the spindle to rotate the disk. The disk centering member is urged by a spring against a washer which holds the disk centering member in its proper position. The spindle is connected to the output shaft of the motor by a screw. The washer is fitted between the spindle and the disk centering member.

10 Claims, 3 Drawing Sheets

DISK ROTATING DEVICE

BACKGROUND OF THE INVENTION

1. Field of the Invention

This invention relates to a device for rotating a sound or data recording medium in the shape of a disk, such as an optical sound recording disk which is known as a compact disk. More particularly, it is a motor and spindle assembly for rotating any such disk.

2. Description of the Prior Art

There has recently been a rapid development for the realization of a very small device for rotating a disk in a magnetic or optical recording apparatus, such as a floppy disk or a compact disk.

A typical device for rotating a compact disk is shown in FIG. 2. It includes a main body 21 in which a disk 20 mounted on a rack can be placed. The main body 21 has a vertically rotatable cover 22 which is lowered, as shown by an arrow, to close the main body 21 in which the disk 20 has been inserted. The cover 22 is provided therein with a disk holder 23 which is vertically rotatable with the cover 22. An electric motor 24 is provided in the main body 21 for rotating the disk 20. A spindle 25 is connected to the motor 24 and cooperates with the disk holder 23 to hold the disk 20 therebetween. The disk holder 23 is usually provided with a magnet which ensures that the disk 20 be held in position.

Reference is now made to FIG. 3 showing how the spindle 25 is connected to the motor 24 in a known disk rotating device. The motor 24 has an output shaft 26 about which the spindle 25 is fitted. A centering member 27 is also fitted about the output shaft 26 of the motor 24 for centering the disk with respect to the axis of rotation of the motor 24. The spindle 25 is press fitted about the shaft 26 and secured thereto. The shaft 26 has a groove 26a in which a washer 28 is engaged to hold the centering member 27 in position on the shaft 26. The washer 28 is usually an E-washer which is generally E-shaped in top plan. A spring 29 is disposed between the spindle 25 and the centering member 27 for urging the centering member 27 against the washer 28.

The known device has, however, the following drawbacks:

(1) When the spindle is press fitted about the output shaft of the motor, a large amount of stress is axially produced on the motor. It is very likely to damage the motor or its output shaft.

(2) A considerably large force is required for press fitting the spindle. It is likely to damage the device as a whole if the spindle is fitted after the motor has been installed in position. Therefore, it is necessary to connect the spindle to the motor before installing the motor in position. The spindle is, however, an obstacle when the motor is joined by screws to a frame 35 which is located between the motor and the spindle, as is obvious from FIG. 3. Therefore, it is essential to employ an additional mounting plate 30 to which the motor is joined before it is installed in position.

(3) The cutting of the groove on the output shaft of the motor for receiving the washer complicates the process for manufacturing the device.

SUMMARY OF THE INVENTION

It is an object of this invention to provide an improved disk rotating device which eliminates the drawbacks of the prior art as hereinabove pointed out.

This object is attained by a device which essentially comprises a spindle secured by a screw to the output shaft of an electric motor and a disk centering member supported by a washer engaged with the spindle.

The device of this invention has, among others, the following advantages:

(1) The spindle is not press fitted about the output shaft of the motor, but secured thereto by a screw. Therefore, neither the motor nor its output shaft is damaged when the spindle is connected thereto.

(2) The spindle can be connected to the output shaft of the motor after the motor has been installed in position. Therefore, the motor can be secured directly to a frame between the motor and the spindle by screws. No additional mounting plate is required for the motor. The device is, therefore, simpler in construction and easier to assemble.

(3) As the washer on which the centering member is supported is provided on the spindle, it is no longer necessary to provide the output shaft of the motor with any groove for receiving the washer. This simplifies the process for manufacturing the device.

Other features and advantages of this invention will be apparent from the following detailed description and the accompanying drawings.

DETAILED DESCRIPTION OF THE INVENTION

Figure 1:
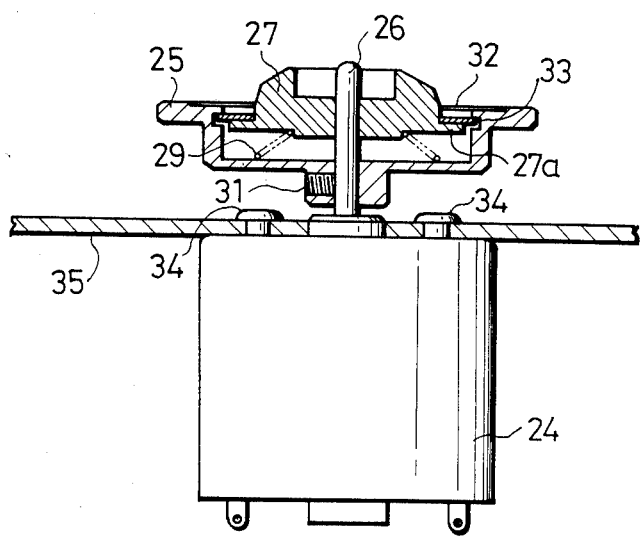
FIG. 1 is a side elevational view, partly in section, of a device embodying this invention.
Figure 2:
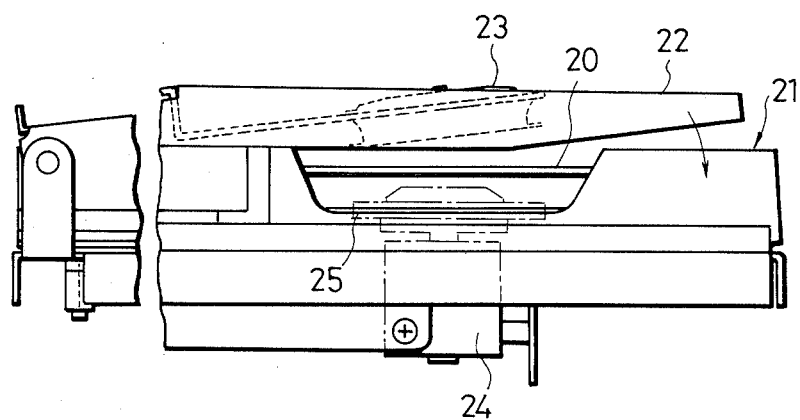
FIG. 2 is a side elevational view of a typical compact disk playing apparatus including a device to which this invention pertains.
Figure 3:
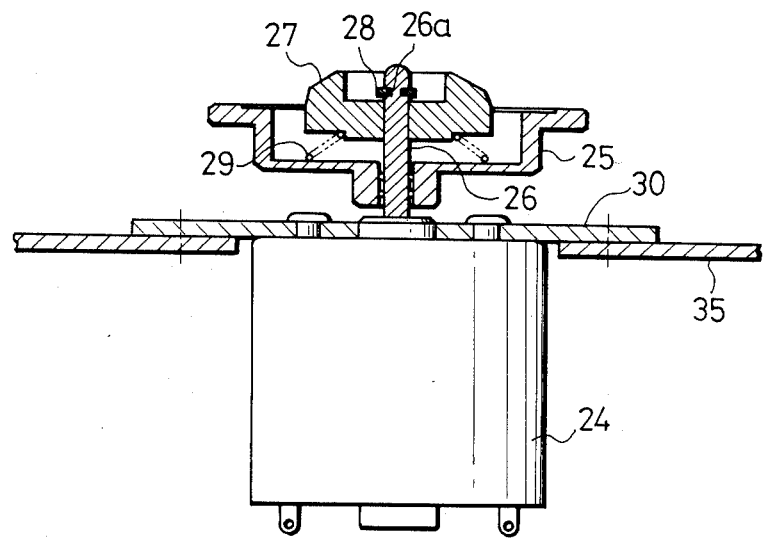
FIG. 3 is a side elevational view, partly in section, of a conventionally known disk rotating device.

Referring to FIG. 1 of the drawings, there is shown a device embodying this invention by way of example. It includes an electric motor 24 having an output shaft 26, a spindle 25 fitted about the output shaft 26 and a disk centering member 27 fitted about the output shaft 26, too. The disk centering member 27 is surrounded by the spindle 25 and has an outside diameter which is substantially equal to the inside diameter of a disk not shown. The spindle 25 is secured to the output shaft 26 by a screw 31. The spindle 25 is substantially shaped like a circular dish and has a projection in the center of its bottom. The projection extends downwardly and faces the motor 24. The projection is fitted about the output shaft 26 of the motor 24 and has a hole which is perpendicular to the output shaft 26, and in which the screw 31 is disposed. The spindle 25 has an inner peripheral surface formed with an annular groove 33 adjacent to the top thereof. An annular washer 32 has an outer peripheral edge fitted in the groove 33. The washer 32 may be formed from a metal or plastics. The washer 32 has a central hole in which the disk centering member 27 is fitted. The disk centering member 27 has at its bottom a radially outwardly projecting flange 27a which is supported on the lower surface of the washer 32. A spring 29 is disposed between the spindle 25 and the disk centering member 27 for urging the disk centering member 27 against the washer 32 and thereby holding it in position on the output shaft 26 of the motor 24. The spring 29 has one end engaged with the inner surface of the bottom wall of the spindle 25 and the other end thereof is engaged with the bottom of the disk centering member 27.

The device as hereinabove described can be incorporated into a disk player by a process which will hereinafter be described. The motor 24 is directly connected to a frame 35 by screws 34. Then, the spindle 25 is inserted about the output shaft 26 of the motor 24 and secured thereto by the screw 31. After the spring 29 has been placed in the spindle 25, the disk centering member 27 is inserted about the output shaft 26 and lowered along it to a position below its proper position by compressing the spring 29. The washer 32 is fitted in the groove 33 of the spindle 25. Although the washer 32 has been described as being annular, it is also possible to use a generally C-shaped washer. Then, the force which has been applied to the disk centering member 27 is removed, whereupon it is moved up by the spring 29 to its proper position in which its flange 27a is held against the washer 32.

Despite the foregoing description, it is also possible to assemble the spindle 25, disk centering member 27, spring 29 and washer 32 beforehand and connect their assembly to the output shaft 26 of the motor 24. This method has the advantage of enabling the preparation of a preassembled unit composed of the spindle 25, disk centering member 27, etc. which can be incorporated into a variety of types of disk rotating devices and thereby makes their mass production possible.

Referring to the word "disk", the spelling "disc" is probably better, as far as at least a compact disc for music is concerned. The spelling "disk" has, however, been used exclusively through the specification and will be used in the claims and the Abstract of the Disclosure, too.

Although the invention has been described with reference to a preferred embodiment thereof, it is to be understood that modifications or variations may be easily made by anybody of ordinary skill in the art without departing from the scope of this invention which is defined by the appended claims.

What is claimed is:

1. In a device for rotating a disk recording medium in a sound or data recording and reproducing apparatus, said device including an electric motor having an output shaft, a spindle fixed to said shaft by fastening means and having an upper surface on which a disk is placed, a disk centering member fitted on said shaft concentrically in a center recess of said spindle and projecting above said surface of said spindle for centering a disk by projecting through a central hole thereof, said disk centering member being biased resiliently by a spring to a projecting position on said shaft relative to said surface of said spindle and being held at the projecting position by retaining means, and a clamp member disposed above said spindle and being movable toward said surface of said spindle for clamping a disk placed and centered thereon,
   the improvement wherein said retaining means for said disk centering member comprises said center recess of said spindle having a retaining part, and a washer engaged between said retaining part of said spindle recess and said disk centering member, the latter being biased by said spring against said washer to the projecting position, and
   wherein said fastening means for fixing said spindle to said shaft includes a screw threaded in a portion of said spindle against said shaft.

2. A device as set forth in claim 1, wherein said spindle is substantially shaped like a circular dish and has at the center of its bottom a downwardly extending projection which is fitted about said shaft, said projection having a hole which is perpendicular to said shaft, and in which said screw is located.

3. A device as set forth in claim 1, wherein said disk centering member has a radially outwardly projecting flange held against said washer, said spring being located on the opposite side of said flange from said washer.

4. A device as set forth in claim 1, wherein said spindle has an inner peripheral surface formed with a groove surrounding said disk centering member, said washer having an outer peripheral edge fitted in said groove and an inner peripheral edge held against said disk centering member.

5. A device as set forth in claim 1, wherein said washer is substantially shaped like the letter "C".

6. A device as set forth in claim 1, wherein said spindle, said disk centering member, said washer and said spring form a preassembled unit which is fixed to said shaft.

7. A device as set forth in claim 2, wherein said spindle, said disk centering member, said washer and said spring form a preassembled unit which is fixed to said shaft.

8. A device as set forth in claim 3, wherein said spindle, said disk centering member, said washer and said spring form a preassembled unit which is fixed to said shaft.

9. A device as set forth in claim 4, wherein said spindle, said disk centering member, said washer and said spring form a preassembled unit which is fixed to said shaft.

10. A device as set forth in claim 5, wherein said spindle, said disk centering member, said washer and said spring form a preassembled unit which is fixed to said shaft.

* * * * *